Aug. 20, 1968  K. J. CLEEREMAN ET AL  3,398,035
THERMOLAMINATION OF PLASTIC SHEET TO FOAM SUBSTRATES
Filed Nov. 5, 1962  3 Sheets-Sheet 1
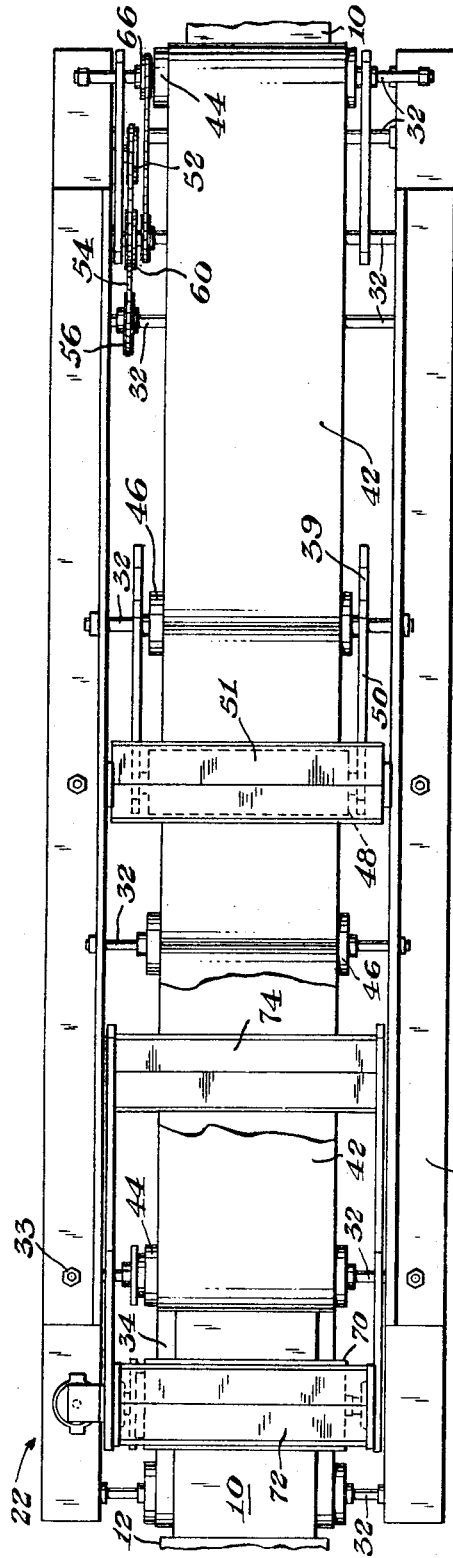
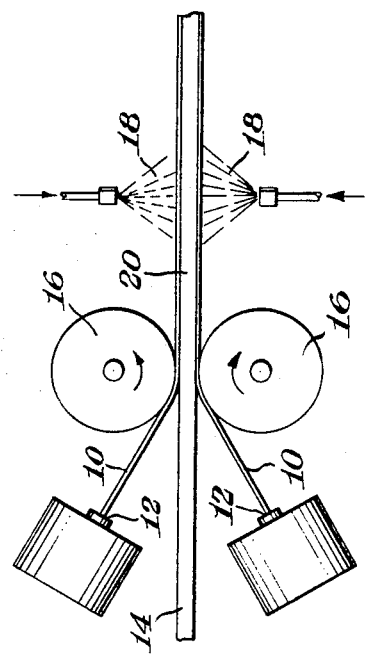
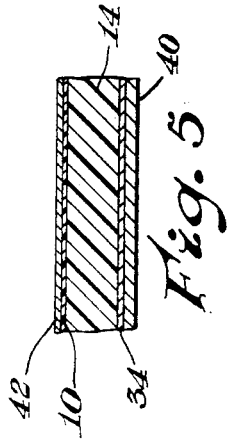
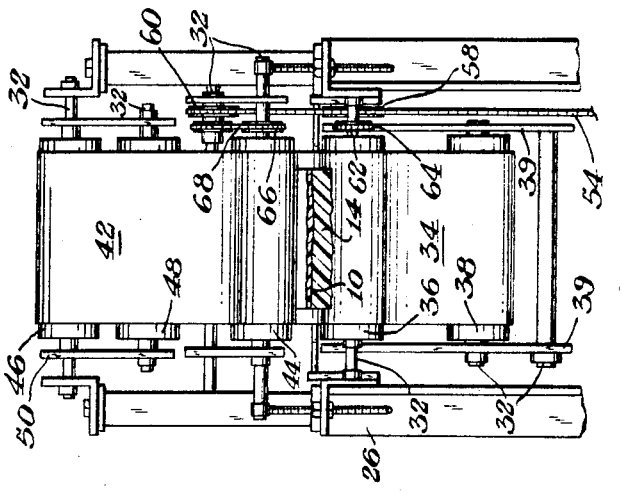
INVENTORS.
Kenneth J. Cleereman
BY Donald J. Dirkse
ATTORNEY

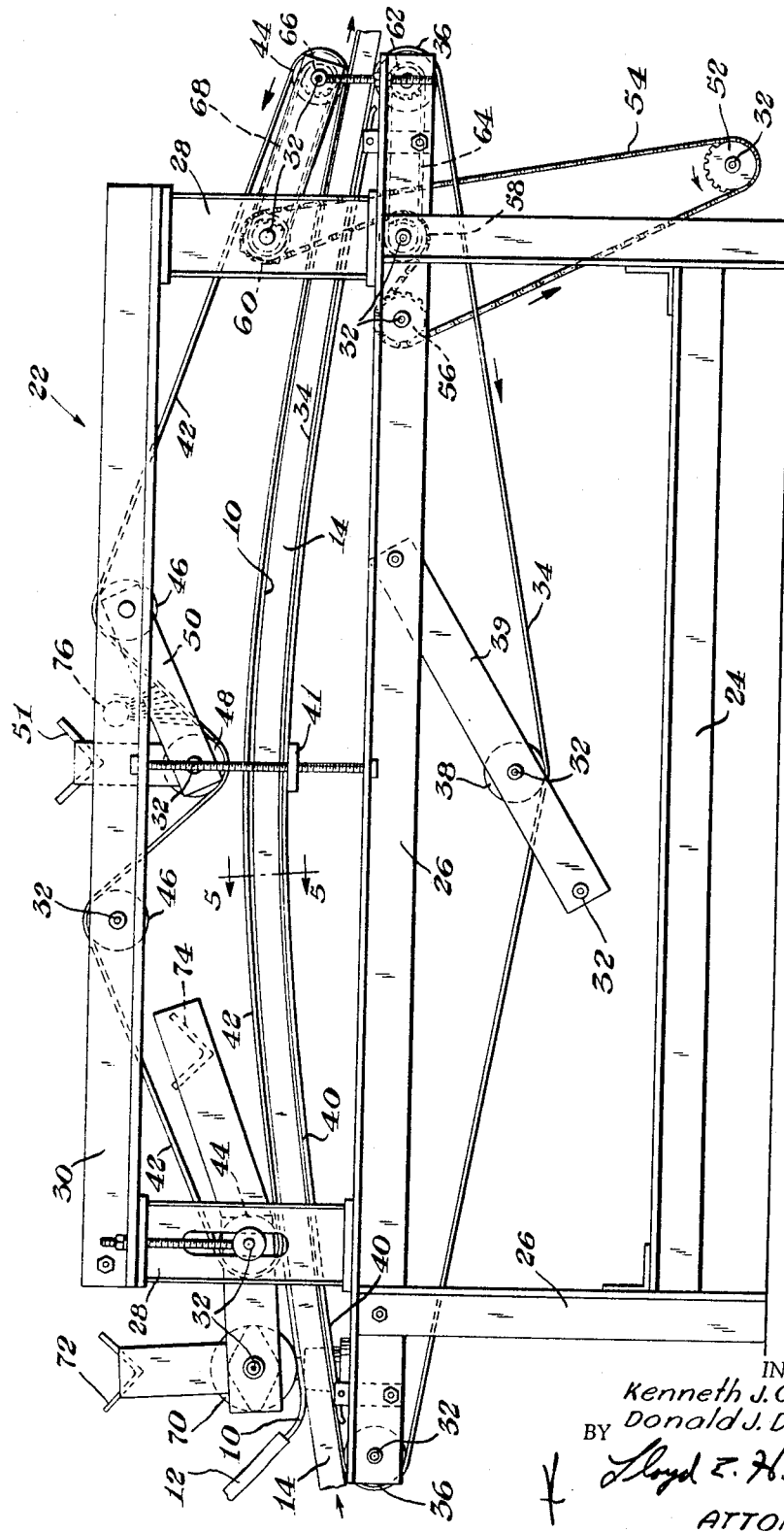

INVENTORS.
Kenneth J. Cleereman
BY Donald J. Dirkse

ATTORNEY

United States Patent Office 3,398,035
Patented Aug. 20, 1968

3,398,035
THERMOLAMINATION OF PLASTIC SHEET
TO FOAM SUBSTRATES
Kenneth J. Cleereman and Donald J. Dirkse, Midland, Mich., assignors to The Dow Chemical Company, Midland, Mich., a corporation of Delaware
Filed Nov. 5, 1962, Ser. No. 235,387
12 Claims. (Cl. 156—244)

This invention relates generally to a method of, and apparatus for, laminating plastic sheet to a foam plastic substrate and, more particularly, relates to method and apparatus for combining of hot extruded plastic sheet with a compatible preformed plastic foam substrate in a continuous manner, and the embossing of the plastic sheet and embedding of decorative elements and reinforcements between the sheet and substrate when desired.

In the past, methods for heat sealing of plastic film to plastic foam have not been entirely satisfactory in that film must be heated to such a temperature that when it meets the substrate, and pressure is applied, it usually results in a distortion of the laminate and in a substantial deformation of the cellular structure of the foam substrate.

Accordingly, it is an object of the present invention to provide an effective method and apparatus for the bonding of plastic sheet to a plastic foam substrate, and to do so in a continuous manner.

It is another object to provide an effective method and apparatus for the lamination of plastic sheet to a plastic foam substrate without using adhesives and without substantially distorting either the sheet or substrate.

Still another object is to provide apparatus for embossment on the surface of a laminate of plastic sheet with plastic foam wherein the embossing takes place substantially as the laminate is being formed.

Another object is to provide a method and apparatus wherein reinforcements and other embellishments which may not adhere either to the sheet or foam substrate of the lamination can be effectively enveloped and locked therebetween due to the tightness of the bond between the plastic parts of the resulting laminate.

A still further object is to provide a method for the laminating of plastic sheet to plastic foam wherein other objects which will heat bond to the plastic sheet can be added on the sheet surface or between the sheet and foam to give certain desired physical and aesthetic properties to the laminate.

Briefly then, the present invention relates to a method of feeding a sheet of hot plastic and non-heated foam, as the plastic sheet is being extruded, between cold compression rollers which press the hot plastic sheet onto the cooler foam while, at the same time, the cold rollers quickly chill the laminating plastic sheet so that shrinkage or melting of the foam does not occur. Novel apparatus for accomplishing the lamination effectively and efficiently is included, and comprises a series of belts or rollers for forming the necessary transporting and pressure functions for the laminating materials.

Yet additional objects and advantages of the present invention, and its numerous cognate benefits and features are even more apparent and manifest in and by the ensuing description and specification taken in conjunction with the accompanying drawing in which, wheresoever possible, like characters of reference designate corresponding material and parts throughout the several views thereof, and in which:

FIGURE 1 is a schematic diagram illustrating the method of the present invention, as applied to multiple sheet lamination;

FIGURE 2 is a side elevational view of apparatus constructed according to the principles of the present invention, for single sheet lamination;

FIGURE 3 is a top plan view, partially broken away, of the apparatus shown in FIGURE 2;

FIGURE 4 is an end elevational view of the apparatus shown in FIGURE 2, as seen from the right end thereof;

FIGURE 5 is a cross-sectional view thereof taken along reference line 5—5 of FIGURE 2;

Figure 7:
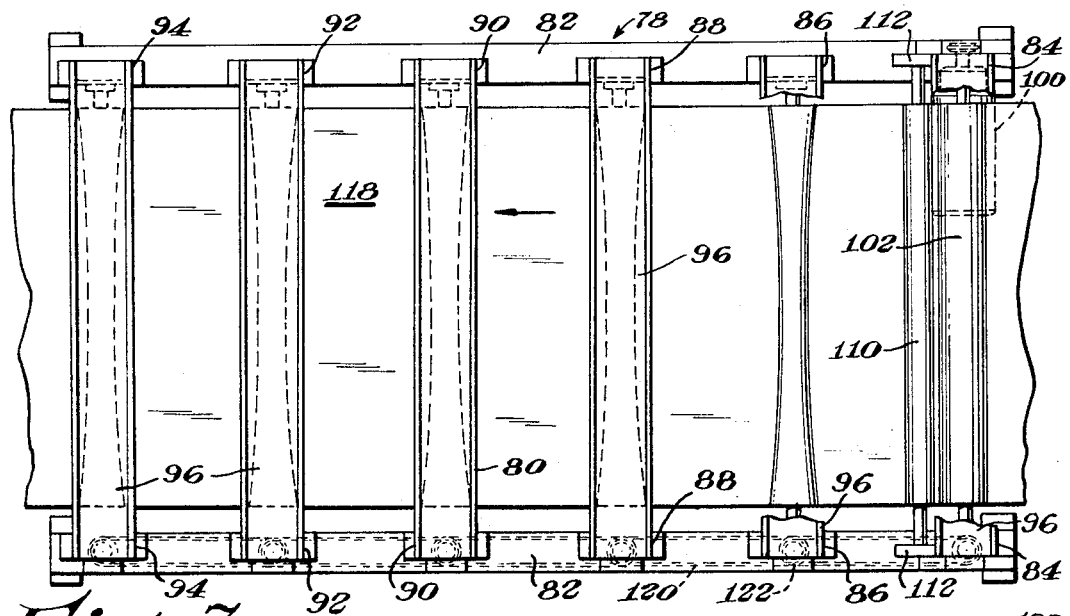
FIGURE 7 is a top plan view of the apparatus shown in FIGURE 6.

The present invention, as represented by the schematic diagram of FIGURE 1, includes the continuous extrusion of hot plastic sheets 10 from dies 12 associated with extruders (not shown) which mate with preformed board-like plastic foam substrate 14. Although continuous extrusion of both the foam and the plastic sheet or film skin would be ideal, the lack of time for foam cure by this method has been found to be troublesome, such that the present invention is particularly designed for the extrusion of hot sheet on cured foam board stock. However, it is to be understood that the principles of the present invention could equally well be adapted to the continuous extrusion of both foam and plastic sheet where proper cure of the continuously extruded foam takes place prior to its lamination with the plastic sheet.

In front of sheeting dies 12 are located a pair of water-cooled driven rollers 16, one or both of which may be adjustable to provide a nip pressure upon the laminate. The extruded sheets 10 and foam substrate 14 are fed through the rollers together, however, they are fed in from different angles and are held apart until they mate at or adjacent the nip of rollers 16. If the extruded sheet is thin enough and the substrate cold enough, the laminate leaving the rollers 16 can be considered substantially formed. However, if the sheet and/or the substrate are still warm after leaving the rollers 16, the finished laminate can be water quenched by sprays 18 to prevent further melting of the foam substrate or distortion of the sheet in the newly forming laminate 20.

A specific apparatus for providing a laminate of a single sheet 10 of plastic film with a plastic foam substrate 14 is that illustrated as apparatus 22 of FIGURES 2–5. Apparatus 22 basically comprises a support frame 24, including a frame bed 26, uprights 28, a frame cross-member 30, and roller supports 32 secured to the different frame members.

A long continuous lower web or belt 34 supported by opposite end rollers 36, kept taut by counter-balancing roller 38 upon beam 39 pivoted with bed 26, provides a feeding mechanism for the foam substrate 14 as it enters the apparatus for lamination with plastic sheet 10. The upper carrying part of web 34 is supported by a continuous plate 40 which is warped somewhat in the middle by adjustable support bar 41, protruding upwardly, to result in a straightening out of the foam board upon its cooling after the lamination is formed. This warping of the laminate stresses the foam 14 and sheet 10, increasing their length, so that when the laminate fully cools it will come back to its normal straight condition. Such is necessary where only one side of the foam is laminated, i.e., where hot plastic film contacts only one side of non-heated foam. But it is to be understood that such pre-stressing is not always necessary when opposite sides of a foam board are hot film laminated, as in FIGURE 1, for equalizing stresses are set up to prevent warping upon subsequent cooling.

An upper web or belt 42 is supported between opposite end rollers 44, upper intermediate rollers 46 being used to keep the web 42 taut and being suspended by beam 50 pivotally connected to frame 24 and weighted by iron 51.

Belts 34 and 42 are actuated by a chain drive mechanism including a motor driven sprocket 52 which rotates chain 54 about other sprockets 56, 58 and 60. Sprocket 58 is connected with roller 36, by way of a sprocket wheel 62 attached to the roller, through chain 64. Likewise, sprocket 60 is connected with roller 44, by way of a sprocket wheel 66 attached to the roller, through chain 68. Sprocket 56 is used to reverse the direction of travel of chain 54 before it reaches sprocket 58, so that the latter will turn in the desired direction. Of course, the direction of travel of each sprocket and the chain 54 is such that belts 34 and 42 travel in the same direction.

Laminating roller 70 is located so as to form a nip with belt 34 as it passes over plate 40. Roller 70 is weighted down by iron 72, balanced by iron 74, to exert the proper laminating pressure. Plastic sheet 10 meets with foam 14 as they enter the nip, with the subsequent laminate passing from under roller 70 and in between webs 34 and 42. Laminating roller 70 is water cooled so that the laminate is cooled substantially as it is being formed. Subsequent cooling can be effected by web 42 which has been dampened by a cold water spray 76 prior to meeting with the laminate. Thus, a main requirement to making a laminate of plastic sheet and a compatible foam substrate, according to the present invention, is to have the sheet at a proper laminating temperature, and provide for a proper change of temperature when it meets the substrate where sufficient pressure is exerted to seal the laminate. Thus, proper selection of sheet temperature at its juncture with the foam is necessary and this can be regulated by the speed and distance the sheet travels from the time it leaves the extruder until it meets the substrate. This temperature control and the chilling of the laminate while it is being formed, and subsequently soon after it is formed, prevents excessive melting of the foam substrate.

Figure 6:
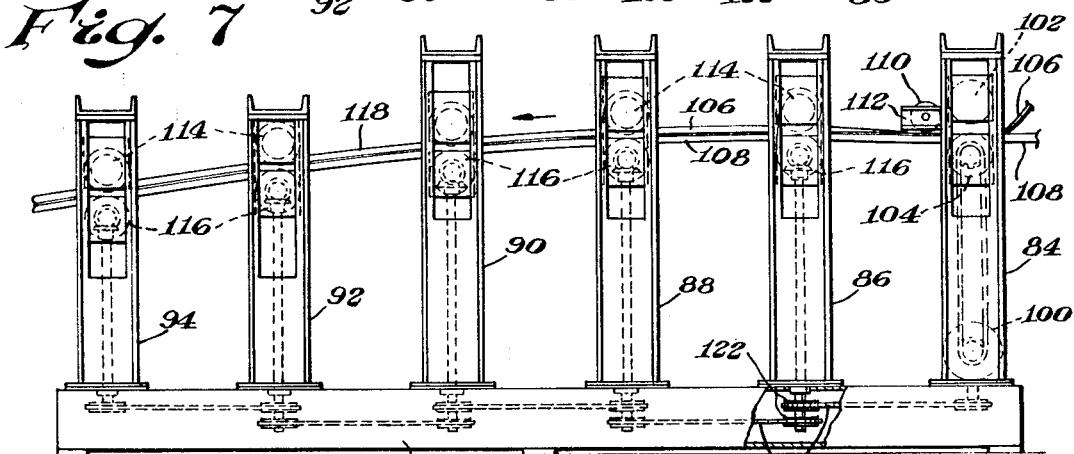
FIGURE 6 is a side elevational view of another form of apparatus constructed according to the principles of the present invention.
Figure 8:
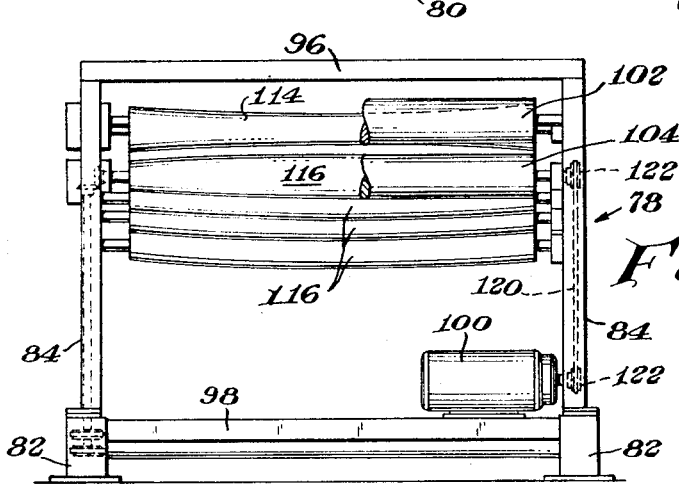
FIGURE 8 is an end elevational view of the apparatus shown in FIGURE 6, as seen from the right end thereof.

Another form of the invention is that illustrated as apparatus 78 in FIGURES 6, 7 and 8. It includes frame 80 which comprises base elements 82 upon which are supported a plurality of spaced pairs of uprights 84, 86, 88, 90, 92 and 94. Each pair of uprights are in turn connected by an upper cross-bar 96 for rigidity. Base elements 82 are connected by a lower cross-bar 98, which also serves as a support for an electric motor 100.

Uprights 84 support laminating rollers 102 and 104 therebetween, the rollers being spaced a distance apart sufficient to provide adequate pressure on extruded plastic sheet 106 as it meets at the nip of the rollers with a length of foam board 108. Roller 102 can be water cooled to provide the necessary immediate cooling effect on the laminate while its parts are being pressed together. Roller 104 optionally can be water cooled if such is necessary to provide more adequate temperature control. A cooled wetted roller 110, preferably having a rubber or fabric cover and an internal water supply, is located closely adjacent laminating rollers 102 and 104 to provide subsequent cooling of the resulting laminate 118. Roller 110 is shown supported by brackets 112 connected to uprights 84.

It can be seen, particularly in FIGURE 6, that each subsequent pair of uprights 86, 88, 90, 92 and 94 support opposed pairs of rollers 114 and 116, and that they do so at a progressively lower position than that of the previous pair of uprights. This presents a downwardly curved pathway for the formed laminate 118 to travel after it leaves laminating rollers 102 and 104. It can also be seen that rollers 114 and 116 have uniformly curved cross-sections throughout their length so that the pathway will be bowed upwardly in the middle section and downwardly at its end portions. The pathway thus presents a bidirectional stressing on the just formed laminate 118 before it has had adequate change to fully cool to room temperature. Such stressing, as discussed previously with respect to apparatus 22, is desirable to prevent warping of the laminate where only one side of a foam substrate is so laminated with a plastic sheet. It is further noted that the downward curving of the pathway also prevents water from roller 110 from draining back towards laminating rollers 102 and 104.

A customary driving mechanism for synchronous movement of rollers 102, 104, 114 and 116 is provided by chains 120 and sprockets 122 which are driven by motor 100.

Certain samples were laminated following the teachings of this invention. One each of a polystyrene, a styrene modified methylacrylate copolymer, and a polyethylene sheet, each from a thickness of .005 to .030 inch, were laminated to a compatible foam substrate from ½-inch to 2 inches thick. The sheet temperature at the extruder die was maintained at between 350° and 450° F., and the laminating roller was located from 1 to 4 feet from the die. With the thinner sheets in the above mentioned range, heat losses encountered required a high-speed take away of from about 10 to 15 feet per minute. With the thicker range of sheets, a slower take-away, as for example at 5 feet per minute, resulted in a satisfactory laminate which was quenched immediately upon leaving the rollers.

Embossing of the laminate can be had by grooving the surface of a laminating roller or by feeding a suitably surfaced material between a laminating roller and a plastic sheet. For example, by feeding hardware cloth (not shown) between a laminating roller and a plastic sheet, a rectangular pattern can be left on the sheet. Embedments and reinforcements can be added by feeding the desired material between a plastic sheet and a substrate just before they meet under the nip of a laminating roller. The heat seal of the hot plastic sheet to the foam substrate is generally sufficient to lock in the reinforcements, the latter also increasing the strength of the resulting laminate. The embossing of such laminate renders them generally more abrasive resistant, as well as more attractive, and the stiffness of the resulting laminates is substantially increased over that of either one of the sheet or foam substrate by itself, and each is physically enhanced when such reinforcing material is embedded therebetween.

Some materials which can be formed as embedments and reinforcements are cotton, saran wire, or fiber glass screen, paper or metal cut-outs, paint, sprinkles of foamable plastic strands or beads, polystyrene granules, cork, glitter, and beads or the like. Likewise, the combined effects of colors and textures of the embedments together with the varying plastic skins and foams provide for limitless custom designing.

Applications of such laminates can be as a turf cover for gymnasium floors, particularly if embossed, this being further developed to include gymnasium mats which would be lightweight, cleanable and inexpensive. A large celled foam sandwich, possibly reinforced or thermoformed can be used as effective diffusers or light transmitting panels such as side-lights or skylights. An embossed rigid skin on a piece of rigid foam can also be used as effective wall planking or door body, such as a substitute for presently used wood paneling. Skin and foam laminates can also have useful applications in packaging, such as for freezer boxes and the like. Other limitless uses of products of the subject invention are obvious.

While certain representative embodiments and details have been shown for the purpose of illustrating the invention, it will be apparent to those skilled in the art that various changes and modifications can be made therein without departing from the spirit and scope of the invention.

Accordingly, what is claimed is:

1. A method for laminating a sheet of thermoplastic film to a compatible substantially unheated temperature frail plastic foam substrate, said method comprising the steps of feeding said sheet in a heated condition adjacent said substrate, pressing said sheet and substrate together, and simultaneously cooling both sides of said sheet and substrate simultaneously with said pressing to form a laminate substantially free of distortion.

2. A method for laminating a sheet of thermoplastic film to a compatible substantially unheated temperature frail plastic foam substrate, said method comprising the steps of feeding said sheet in a heated condition adjacent said substrate, pressing said sheet and substrate together, simultaneously cooling both sides of said sheet and substrate simultaneously with said pressing, and subsequently further cooling said sheet and substrate to form a laminate substantially free of distortion.

3. A method for laminating a sheet of thermoplastic film to a compatible plastic foam substrate, said method comprising the steps of feeding said sheet in a heated condition adjacent said substrate, pressing said sheet and substrate together while simultaneously embossing the former, cooling said sheet and substrate simultaneously with said pressing, and subsequently further cooling said sheet and substrate to form a laminate substantially free of distortion.

4. A method for laminating a sheet of thermoplastic film to a compatible plastic foam substrate, said method comprising the steps of feeding said sheet in a heated condition adjacent said substrate, pressing said sheet and substrate together, cooling said sheet and substrate simultaneously with said pressing, stressing said sheet and substrate, and subsequently further cooling said sheet and substrate to form a laminate substantially free of distortion.

5. A method for laminating a sheet of thermoplastic film to a substantially unheated temperature frail plastic foam substrate, said method comprising the steps of extruding said sheet onto said substrate before said sheet cools to the temperature of said substrate and while said sheet is still soft, pressing said sheet and substrate together while immediately simultaneously cooling both sides of said sheet and substrate to a bonding temperature to form a laminate substantially free of distortion.

6. The method of claim 5 wherein said laminate is embossed as said sheet and substrate are pressed together.

7. A method for laminating a sheet of thermoplastic film to a plastic foam substrate, said method comprising the steps of extruding said sheet onto said substrate before said sheet cools to the temperature of said substrate and while said sheet is still soft, pressing said sheet and substrate together while immediately cooling said sheet and substrate to a bonding temperature to form a laminate substantially free of distortion, and stressing said laminate to prevent warping thereof when fully cooled.

8. A method for laminating a sheet of thermoplastic film to a plastic foam substrate, said method comprising the steps of extruding said sheet onto said substrate before said sheet cools to the temperature of said substrate and while said sheet is still soft, pressing said sheet and substrate together while immediately cooling said sheet and substrate to a bonding temperature to form a laminate substantially free of distortion, and biaxially stressing said laminate to prevent warping thereof when fully cooled.

9. A method for laminating sheets of thermoplastic film to opposite sides of a substantially unheated temperature frail plastic foam substrate, said method comprising the steps of engaging said sheets each on opposite sides of said substrate with said sheets being at a temperature sufficient to be softened, pressing said substrate between said sheets while immediately simultaneously cooling both sides of said sheets to a bonding temperature to form a laminate substantially free of distortion.

10. Apparatus for laminating a sheet of thermoplastic film to a length of plastic foam, said apparatus including a moving pathway for carrying said foam, laminating means adjacent one end of said pathway for receiving said foam and said sheet and for pressing them together, said means providing for the cooling of said sheet substantially as it is pressed with said foam, a confining means located generally opposite to said pathway along portions thereof from said laminating means generally to the other end of said pathway, said confining means being spaced substantially parallel with said pathway and of a distance therefrom not substantially greater than the thickness of the sheet and foam laminate, said pathway and confining means being curved so as to stress said laminate after it leaves said laminating means and before it is fully cooled to room temperature.

11. Apparatus for laminating a sheet of thermoplastic film to a length of plastic foam, said apparatus including a moving pathway for carrying said foam, laminating means adjacent one end of said pathway for receiving said foam and said sheet and for pressing them together, said means providing for the cooling of said sheet substantially as it is pressed with said foam, a confining means located generally opposite to said pathway along portions thereof from said laminating means generally to the other end of said pathway, said confining means being spaced substantially parallel with said pathway and of a distance therefrom not substantially greater than the thickness of the sheet and foam laminate, said pathway and confining means being curved so as to stress said laminate in both longitudinal and transverse directions after it leaves said laminating means and before it is fully cooled to room temperature.

12. Apparatus for laminating a sheet of thermoplastic film to a length of plastic foam, said apparatus including frame members, a first bank of rollers supported by said members, a second bank of rollers supported by said members and located generally opposite and spaced from said first bank of rollers, at least an opposing pair of said rollers adjacent one end of said apparatus spaced so as to press said film and foam together with the roller engaging said film being at a lower temperature than said film, said banks of rollers being curved downwardly from said one end of the apparatus to its other end, and at least some of each of the remaining opposing pair of rollers presenting opposed surfaces curved from their center portions downwardly to their outer portions to thereby provide for bidirectional stressing of the formed laminate.

References Cited

UNITED STATES PATENTS

| | | | |
|---|---|---|---|
| 2,853,411 | 9/1958 | Riley | 161—160 |
| 2,983,962 | 5/1961 | Merz et al. | 156—244 |
| 3,159,698 | 12/1964 | Suh et al. | 264—210 |
| 3,186,895 | 6/1965 | MacDonald | 156—285 |
| 3,196,062 | 7/1965 | Kristal | 156—79 |
| 3,127,304 | 3/1964 | Borup | 156—163 |
| 2,072,105 | 3/1937 | Fischer | 156—244 |
| 2,308,638 | 1/1943 | Balthis et al. | 117—49 X |
| 2,690,206 | 9/1954 | Mueller | 156—501 |
| 3,222,237 | 12/1965 | McKelvy | 156—244 |
| 3,234,065 | 2/1966 | Best | 264—321 X |

EARL M. BERGERT, *Primary Examiner.*

T. R. SAVOIE, *Assistant Examiner.*